United States Patent
Panavich et al.

(10) Patent No.: US 8,782,356 B2
(45) Date of Patent: Jul. 15, 2014

(54) AUTO-ORDERING OF STRONGLY ORDERED, DEVICE, AND EXCLUSIVE TRANSACTIONS ACROSS MULTIPLE MEMORY REGIONS

(75) Inventors: Jason Lawrence Panavich, Raleigh, NC (US); James Norris Dieffenderfer, Apex, NC (US); Thomas Andrew Sartorius, Raleigh, NC (US); Thomas Philip Speier, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 13/315,370

(22) Filed: Dec. 9, 2011

(65) Prior Publication Data

US 2013/0151799 A1 Jun. 13, 2013

(51) Int. Cl.
*G06F 13/20* (2006.01)
*G06F 13/36* (2006.01)
*G06F 13/18* (2006.01)

(52) U.S. Cl.
USPC .......................................... 711/157; 711/154

(58) Field of Classification Search
CPC . G06F 13/1621; G06F 13/18; G06F 12/0607; G06F 13/1647; G06F 3/0659; G06F 3/0611; G06F 3/0613; G06F 13/1626; G06F 13/1642; G06F 13/20; G06F 13/36; H03M 13/27
USPC ......................................... 711/157, 167, 154
See application file for complete search history.

(56) References Cited

U.S. PATENT DOCUMENTS

| | | |
|---|---|---|
| 5,832,304 A | 11/1998 | Bauman et al. |
| 6,038,646 A | 3/2000 | Sproull |
| 6,275,913 B1 | 8/2001 | Jeddeloh |
| 6,275,914 B1 | 8/2001 | Jeddeloh |
| 6,754,751 B1 | 6/2004 | Willke |
| 7,500,045 B2 | 3/2009 | Hofmann et al. |
| 2003/0009622 A1 | 1/2003 | Gaskins et al. |
| 2005/0289306 A1 | 12/2005 | Muthrasanallur et al. |
| 2010/0182819 A1* | 7/2010 | Matsufuji et al. ............... 365/96 |

OTHER PUBLICATIONS

International Search Report and Written Opinion—PCT/US2012/068820—ISA/EPO—Mar. 6, 2013.

* cited by examiner

*Primary Examiner* — Mardochee Chery
(74) *Attorney, Agent, or Firm* — Peter Michael Kamarchik; Nicholas J. Pauley; Joseph Agusta (57) ABSTRACT

Efficient techniques are described for controlling ordered accesses in a weakly ordered storage system. A stream of memory requests is split into two or more streams of memory requests and a memory access counter is incremented for each memory request. A memory request requiring ordered memory accesses is identified in one of the two or more streams of memory requests. The memory request requiring ordered memory accesses is stalled upon determining a previous memory request from a different stream of memory requests is pending. The memory access counter is decremented for each memory request guaranteed to complete. A count value in the memory access counter that is different from an initialized state of the memory access counter indicates there are pending memory requests. The memory request requiring ordered memory accesses is processed upon determining there are no further pending memory requests.

34 Claims, 5 Drawing Sheets

AUTO-ORDERING OF STRONGLY ORDERED, DEVICE, AND EXCLUSIVE TRANSACTIONS ACROSS MULTIPLE MEMORY REGIONS

FIELD OF THE DISCLOSURE

The present disclosure relates generally to processing systems and more particularly, to techniques for maintaining order of strongly ordered operations, device memory operations, and exclusive access requests for controlling atomic operations in a weakly ordered storage system.

BACKGROUND

Many portable products, such as cell phones, laptop computers, tablet personal computers (PCs), personal data assistants (PDAs) or the like, incorporate a processing system having one or more processors executing programs that support communication and multimedia applications. The processing system for such products may also include complex memory systems for storing instructions and data, controllers, and peripheral devices configured to interface with the processors and memory over one or more busses.

In such processing systems, the processors often achieve performance benefits by allowing memory operations to be performed out of order. For example, a sequence of memory operations may be reordered to allow those operations to the same page in memory to be executed before a new page is opened. Processing systems that are allowed to reorder memory operations are generally referred to as "weakly ordered" processing systems.

In certain instances, the reordering of memory operations may unpredictably affect program behavior. For example, a bus master writes data to a first in first out (FIFO) in a peripheral device, such as an Ethernet controller, and follows the last data write with a write to a control register in the same peripheral indicating that the data can be transmitted. If the write to the control register and the write to the data register are reordered, an incomplete packet will be transmitted.

In another example, an application may require a first processor to write a block of data beginning at a first memory address and write a data ready flag to a second memory address indicating the block of data is stored. A second processor is to monitor the data ready flag and when the flag indicates the data has been stored, to read the block of data. In a weakly ordered processing system, there is no guarantee that this order of operations will occur, which may be unacceptable. Also, in a weakly ordered processing system, peripheral devices, in addition to the processors, may operate as bus masters for sending data to and receiving data from memory which may further complicate maintaining order of program storage operations.

Various techniques have been employed for executing ordered memory operations in a weakly ordered processing system. One technique is to use a bus command referred to as a barrier command which is issued when an ordered memory operation is required. The barrier command may be used to ensure that all memory access requests issued by a processor before the barrier command are completed before any memory access requests issued by the processor after the barrier command are executed. Again, in the previous example, a barrier command could be issued by the first processor before writing the data ready flag. This barrier command would ensure that the block of data is written to the memory before the data ready flag is written which ensures the second processor reads the newly stored data.

Some processors, peripheral devices, and bus implementations may not recognize barrier commands. Weakly ordered processing systems that utilize barrier commands would be restricted from using such processors, peripheral devices, and busses. As a consequence, the weakly ordered processing systems may not perform efficiently. Additionally, the execution of a barrier command in a system that does support barriers is usually inefficient and overly time consuming. In the above examples, only writes to data and a flag are required to be ordered, but a barrier command orders all memory operations in addition to the data and the flag.

SUMMARY

Among its several aspects, the present disclosure recognizes that providing more efficient methods and apparatuses for controlling ordered accesses in a weakly ordered storage system may improve performance and reduce power requirements in a processing system. To such ends, an embodiment of the invention addresses a method for ordering memory requests requiring ordered memory accesses. A stream of memory requests is split into two or more streams of memory requests. A memory request requiring ordered memory accesses is identified in one of the two or more streams of memory requests. The memory request requiring ordered memory accesses is stalled upon determining a previous memory request from a different stream of memory requests is pending.

Another embodiment addresses an apparatus for ordering memory requests requiring ordered memory accesses. A stream splitting circuit is configured to monitor a first stream of memory requests and is configured to split the first stream of memory requests into a second stream of memory requests and a third stream of memory requests. A tracking circuit is configured to detect a memory request requiring ordered memory accesses from the second stream of memory requests that is a different stream of memory requests from the third stream of memory requests having a pending memory request. A stall circuit is configured to stall the second stream of memory requests requiring ordered memory accesses in response to the pending memory request until the pending memory request is guaranteed to complete in order.

Another embodiment addresses an apparatus for ordering memory accesses. A switch and control circuit is configured to split a stream of memory requests into two or more streams of memory requests directed to two or more corresponding bus ports according to an attribute associated with the corresponding bus ports. A tracking circuit is configured to detect a memory request requiring ordered memory access in a first stream of memory requests and to detect one or more pending memory requests in a second stream of memory requests. A stall circuit is configured to stall the ordered memory access request until the tracking circuit indicates there are no more pending memory requests.

Another embodiment addresses a computer readable non-transitory medium encoded with computer readable program data and code for operating a system. A stream of memory requests is split into two or more streams of memory requests. A memory request requiring ordered memory accesses is identified in one of the two or more streams of memory requests. The memory request requiring ordered memory accesses is stalled upon determining a previous memory request from a different stream of memory requests is pending.

Another embodiment addresses an apparatus for ordering memory requests requiring ordered memory accesses. Means for monitoring a first stream of memory requests and for splitting the first stream of memory requests into a second stream of memory requests and a third stream of memory requests. Means for detecting a memory request requiring ordered memory accesses from the second stream of memory requests that is a different stream of memory requests from the third stream of memory requests having a pending memory request. Means for stalling the second stream of memory requests requiring ordered memory accesses in response to the pending memory request until the pending memory request is guaranteed to complete in order.

A further embodiment addresses an apparatus for ordering memory accesses. Means for splitting a stream of memory requests into two or more streams of memory requests directed to two or more corresponding bus ports according to an attribute associated with the corresponding bus ports. Means for detecting a memory request requiring ordered memory access in a first stream of memory requests and for detecting one or more pending memory requests in a second stream of memory requests. Means for stalling the ordered memory access request until the tracking circuit indicates there are no more pending memory requests.

It is understood that other embodiments of the present invention will become readily apparent to those skilled in the art from the following detailed description, wherein various embodiments of the invention are shown and described by way of illustration. It will be realized that the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
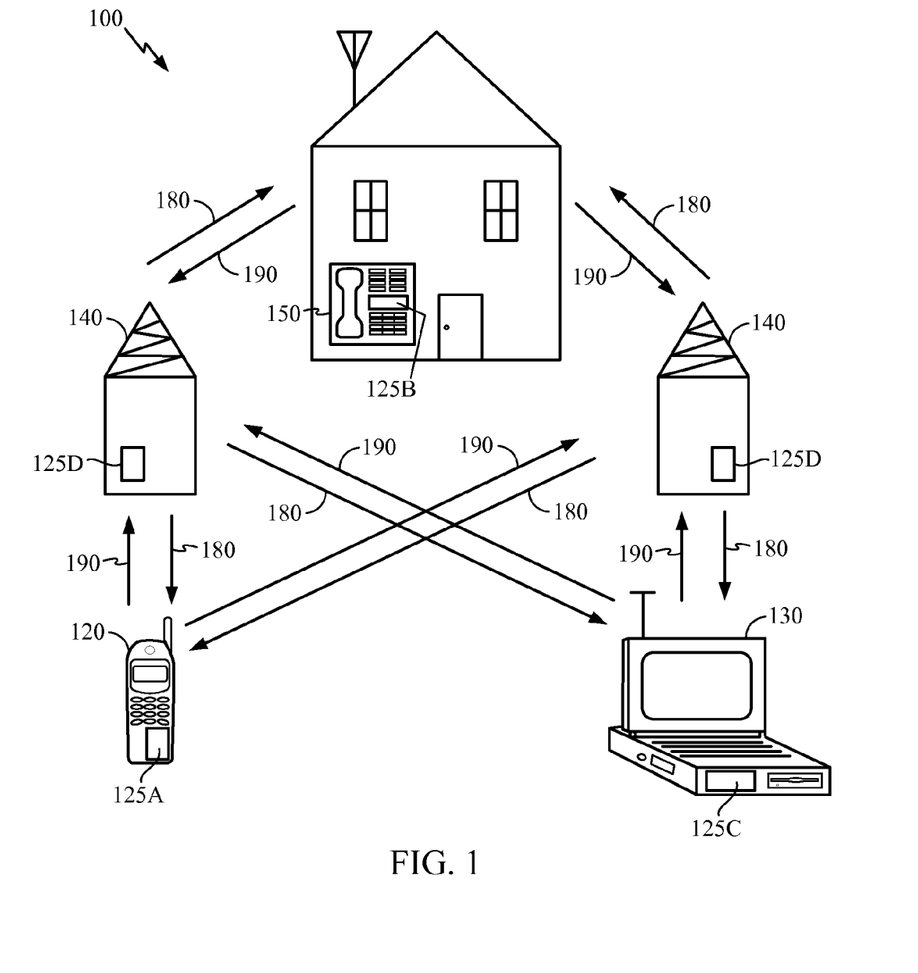
FIG. 1 illustrates a wireless communication system in which an embodiment of the invention may be advantageously employed.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication system (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any processing system operating with a weakly ordered storage subsystem.

One technique to ensure that memory operations are executed in program order is to use a memory barrier instruction which ensures that all memory accesses resulting from pre-barrier instructions are acknowledged to complete in order prior to those agents observing memory accesses resulting from post-barrier instructions. For example, a bus architecture may be utilized that guarantees a strict program ordering of strongly ordered (SO) and device (DV) memory operations in a weakly ordered memory system for those requests whose addresses are within a specified memory region or memory block size. A strongly ordered (SO) request and a device (DV) memory request are treated in a similar fashion as described in more detail below and referenced as SO/DV memory requests. However, in such a system, SO/DV memory requests to different memory regions are not guaranteed to be ordered with respect to each other. As a consequence, software is required to enforce the ordering constraint of SO/DV requests by inserting a barrier instruction between SO/DV requests to different memory regions for which strict program ordering is required to guarantee correct operation. However, determining where to place a barrier instruction is not easy, resulting in code being developed without barrier instructions where required and with barrier instructions where they may not be needed to guarantee correct operation.

Figure 2A:
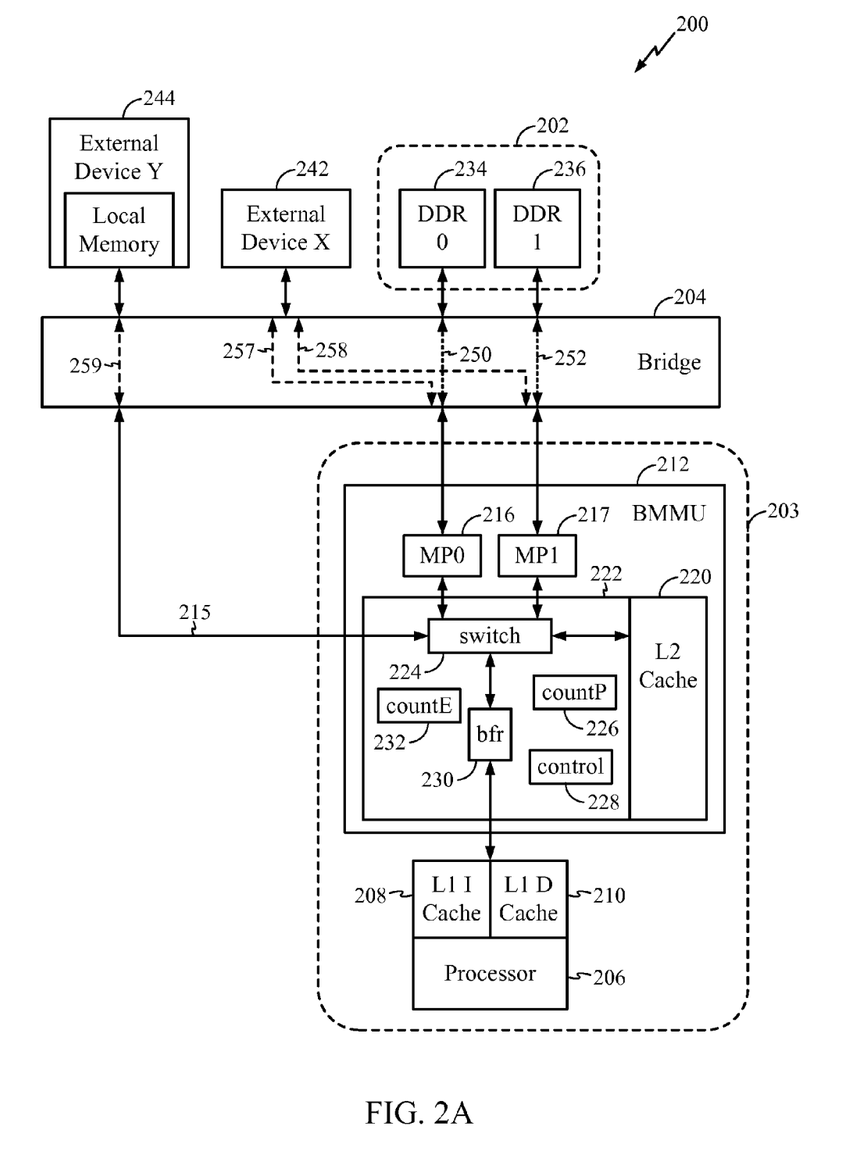
FIG. 2A illustrates an exemplary processing system configured to operate in a weakly ordered storage system in which an embodiment of the invention may be advantageously employed.

A processor may achieve improved performance and guarantee correct operation of SO/DV memory requests using the techniques as described below with regard to FIG. 2A. FIG. 2A shows an exemplary processing system 200 configured to operate in a weakly ordered storage system which may suitably be employed in components 125A, 125C, 125B, and 125D of FIG. 1. The processing system 200 includes main memory 202 and a system core 203 coupled to the main memory 202 and external devices 242 and 244 over a bus bridge 204. The system core 203 comprises a processor 206, a level 1 instruction cache (L1 I-cache) 208, a level 1 data cache (L1 D-cache) 210, and a bus and memory management unit (BMMU) 212. The BMMU 212 includes a master port 0 (MP0) 216, a master port 1 (MP1) 217, a level 2 unified cache (L2 cache) 220, and a path and count circuit 222. The path and count circuit 222 includes a switch 224, a counter circuit for processor requests (countP) 226, a control circuit 228, a buffer (bfr) 230, and a counter circuit for external device requests (countE) 232 as configurable elements for controlling ordered accesses in a weakly ordered storage system. The main memory 202 is comprised of a double data rate 0 (DDR0) memory device 234 and a DDR1 memory device 236. The external devices include an external device X 242, such as a DDRx memory, and an external device Y 244 acting as a bus master and having an internal processor and local memory. The bus bridge 204 provides a direct path from MP0 216 to the DDR0 memory device 234 over a path 250 and a direct path from MP1 217 to the DDR1 memory device 236 over a path 252. The bus bridge 204 also provides exemplary paths 257-259 as described in more detail below.

The processor 206 and the external device Y 244 may each be implemented as a bus mastering device, such as a general purpose processor or multiprocessor, a digital signal processor (DSP), an application specific processor (ASP) or the like. An external peripheral device, such as the external device Y 244, may be a memory device, a memory controller, a bridge device for interconnecting to another bus interconnect device, a peripheral device such as a hard disk controller, a universal serial bus (USB) controller, an interactive display device, a radio device coupling a controller to a transmitter and receiver, or the like. The external device Y 244 may also utilize direct memory access (DMA) techniques for reading or writing data to the main memory 202.

The processor 206 and the external device Y 244, for example, may be configured to execute instructions under control of a program stored on a non-transitory computer readable storage medium. For example, a computer readable storage medium may be either directly associated locally with the processor 206 or the external device Y 244, such as may be available through one of the instruction caches 208 and 220, local memory associated with the external device Y 244, or accessible to the external device Y 244 through the bus bridge 204. The processor 206 may access data from the main memory 202 in the execution of a program. The external device Y 244 also may access data residing in a memory device either directly associated locally with each external device, or accessible through the bus bridge 204 from another processor memory device, such as the DDR0 memory device 234, for example.

The bus bridge 204 manages bus traffic and provides connection paths between the system core 203, the external device Y 244, the main memory 202, and other peripheral devices such as the external device X 242. The bus bridge 204 may be configured, for example, with dedicated channels between the MP0 216 and MP1 217 and the DDR0 memory device 234 and DDR1 memory device 236, respectively. While two memory devices, DDR0 234 and DDR1 236, are shown in FIG. 2A, a single memory device could be used with the two master ports MP0 216 and MP1 217 to take advantage of interleaved accesses between the two master ports. It is also noted that one or more master ports (MPs) may be used even though interleaved access is not used. For example, if the main memory 202 is implemented as a single ported memory device, requests may still be issued from MP0 216 and MP1 217 to the single ported memory device. Since memory access requests from MP0 216 and MP1 217 reconverge when accessing the external device X 242 and when accessing a single ported main memory device, the memory requests may get out of program order without use of the techniques of the present invention.

When the bridge 204 acknowledges a memory request, the acknowledgement assures the requesting device that the request to a targeted external device will complete in the order required. So when an SO/DV memory request is delivered through MP0 216, any new SO/DV requests to MP1 are stalled until the request to MP0 receives such an acknowledgement. It is noted that acknowledgements for read requests and write requests are different, but the system waits for the appropriate response. An acknowledgement from the bridge 204 may not indicate to processor 206 that the request has completed, but it is sufficient to indicate that an external slave device will observe the memory access from MP0 before it observes the memory access from MP1, for example. In some systems, an acknowledgement may actually be a completion indication. In the present implementation, an acknowledgement represents a guarantee that the memory request reached a point in the system where program ordering is guaranteed. For example, the BMMU 212 splits a stream of memory requests and then the request streams, paths 257 and 258, are reconverged to an external device, such as the DDR-X memory in external device X 242 or, for example a single ported main memory device. When requests are presented on one of the paths 257 and 258, by stalling requests to the other one of the paths 257 and 258, the order of SO/DV memory requests that entered the switch 224 is the same that reaches the DDR-X memory in the external device X 242 and would also be the same that reaches the exemplary single ported memory device. Even after a request leaves the BMMU 212, some time may elapse before the request is actually received at the targeted memory, but the BMMU 212 has done its part to preserve the order.

In the processing system 200, the bus and memory management unit (BMMU) 212 ensures correct ordering of SO/DV memory access operations. In particular, the exemplary devices may utilize write data, address, and read data busses and associated control signals. In many systems, a combined write and read data bus may be used. Generally, the separate address, read data, and write data busses conform to a particular bus architecture, or standard, depending upon the requirements of a particular system. A memory access request may include a write or store request generated in response to execution of a store instruction, a read or load request generated in response to execution of a load instruction, or bus related requests, which may include memory barrier commands. Also, by definition, a SO/DV request is non-cacheable. Not all bus interfaces used by external masters support or recognize memory barrier commands even if one was issued by the external master. Also, not all devices support memory barrier commands.

In a first example, the processor 206 generates a stream of memory requests to the main memory 202 which are buffered in bfr 230 and split by switch 224 to MP0 216 or MP1 217. By splitting the stream of memory requests into multiple streams, for example based on a memory request for a location within a specified memory region, memory requests between the streams may be automatically ordered without use of software techniques, such as inserting memory barrier commands in code executed by the processor. For example, a stream of memory requests may be split based on capacity and on odd and even memory region addresses and the memory requests between odd and even memory regions may be automatically ordered. By system definition, the DDR0 memory device 234 stores even memory regions of data where a memory region of data is of 1 KB capacity and bit 10 of a memory request address may be utilized to determine whether a memory request is for data in an even memory region or in an odd memory region. The DDR1 memory device 236 stores odd addressed memory regions of data each also of 1 KB capacity. The control circuit 228 monitors the stream of memory requests and bit 10 of the memory request addresses, in this exemplary scenario for 1 KB memory regions, to control the switch 224. With bit 10 of a memory request address in a first state, a memory request to an even memory region is passed to MP0 216. With bit 10 of a memory request address in a second state, a memory request to an odd memory region is passed to MP1 217.

In another embodiment, the DDR0 memory device 234 stores even memory regions of data where a memory region of data is of defined by hashing the address of the request and the result of the hash may be utilized to determine whether a memory request is for data in an even memory region or in an odd memory region. The DDR1 memory device 236 stores odd hashed memory regions. The control circuit 228 monitors the stream of memory requests and calculates the hash of the memory request addresses to control the switch 224. With the result of the hash of the memory request address in a first state, a memory request to an even memory region is passed to MP0 216. With the result of the hash of the memory request address in a second state, a memory request to an odd memory region is passed to MP1 217.

By monitoring a stream of memory requests, requests which change between odd and even memory regions may be identified and stalled until an indication is received that pending requests are guaranteed to complete in order. A tracking approach uses a counter, such as the counter countP 226, that increments upon receipt of each memory request and decrements when a response to a request is received that indicates the request will complete in order. New SO/DV memory requests that change between the DDR0 memory device 234 and the DDR1 memory device 236 when there are memory requests pending with the previous memory device are stalled until the pending memory requests are guaranteed to complete. A stalled memory request remains pending until enabled to be processed. SO/DV memory requests that change between odd and even memory regions and that are stalled do not cause the counter to be incremented. After pending requests are completed and the counter appropriately decremented to an initial count value, such as zero, a stalled request is processed and the counter is then incremented for the stalled request being processed. Since requests within an odd address stream of memory requests or within an even address stream of memory requests are, by way of acknowledgements described above, guaranteed to complete in order, only the requests that change between the streams are monitored for the purpose of stalling requests to an opposite stream. Determining that a request represents a change between streams may be accomplished by saving state that indicates a memory request address boundary of a previous request or sequence of requests is different from the address boundary of the current memory request. For example, a stream of one or more requests to odd address 1K memory regions may be represented by a single asserted pending stream bit which when compared with a zero value in bit 10 of a current request indicates the current request may need to be stalled if there is a pending count in the counter. Once the pending requests are acknowledged and the counter returns to its initial state, the stalled request is processed and the pending stream bit is de-asserted to indicate that requests to even address 1K memory regions are in process or pending.

SO/DV requests are monitored even if an SO/DV request is within the same stream of requests in order to increment the counter, such as the counter countP 226.

An external master device, such as the external device Y 244, is configured to operate in a similar manner for controlling SO/DV requests and monitoring for requests that change between even address requests to DDR0 memory device 234 and odd address requests to DDR1 memory device 236. A stream of memory requests issued by the external device Y 244 is monitored and the switch 224 is controlled by the control circuit 228 passing the even address requests to DDR0 memory device 234, saving state to indicate even address requests are pending, and incrementing the counter countE 232. Requests from the external device Y 244 which change between a memory previously being accessed (for example, DDR0 memory device 234) to a different memory (for example, DDR1 memory device 236) are stalled until pending requests to the previous memory are guaranteed to complete, as indicated by the countE value being decremented to its initial value, such as zero. The saved state is then asserted to indicate the stalled request to the DDR1 memory device 236 is being processed. The exemplary path 259 is for requests that are either cached in the L2 cache 220 or are directed through the BMMU 212 that target an external device or main memory 202.

Figure 2B:
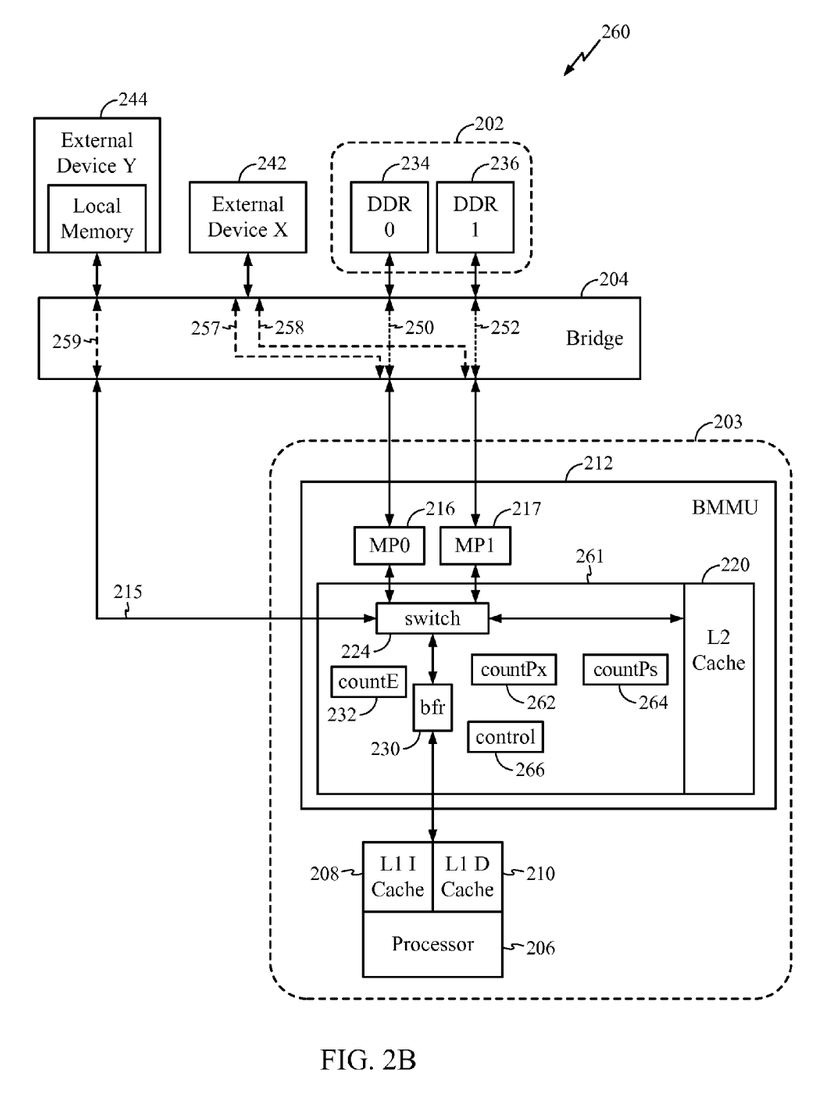
FIG. 2B illustrates a second exemplary processing system configured to coordinate strongly ordered and load/store exclusive operations in a weakly ordered storage system in which an embodiment of the invention may be advantageously employed.

FIG. 2B illustrates an exemplary second processing system 260 configured to coordinate strongly ordered and load/store exclusive operations in a weakly ordered storage system in which an embodiment of the invention may be advantageously employed. The second processing system 260 is similar to the processing system 200 of FIG. 2A except for a counter circuit for processor requests, such as countP 226, expanded from one counter to two counters. One type of memory requests requiring ordered memory accesses is a sequence of memory access exclusive instructions that provide atomic memory accesses. A second type of memory requests requiring ordered memory accesses is a strongly ordered or a device (SO/DV) request described above. A load exclusive instruction or a store exclusive instruction counter (countPx) 262 and an SO/DV counter (countPs) 264 are utilized to maintain an original order of memory requests in a request stream to a target device even when the request stream is split to multiple paths that converge at the target device. The countPx 262 and countPs 264 counters are controlled by control circuit 266 as described in more detail below. Table 1 below illustrates a stream of memory requests with strongly ordered or load/store exclusive attributes that are applied to the second processing system 260 to illustrate various embodiments of the invention.

TABLE 1

| | Memory Requests | Memory Address | Bus Master Port |
|---|---|---|---|
| 1 | LDREX | A | MP0 |
| 2 | LDREX | B | MP1 |
| 3 | SO/DV | C | MP1 |
| 4 | STREX | B | MP1 |

The memory requests include a load exclusive (LDREX) instruction, a store exclusive (STREX) instruction, and a strongly ordered or device (SO/DV) memory request. The LDREX and STREX instructions may be suitably used for implementing semaphores by providing a mechanism that guarantees atomic access of a flag or variable that represents state of a memory value or memory region, such as locked or unlocked. The four memory requests in Table 1 are briefly described and then the operation of the second processing system 260 is described with this memory request stream.

The first LDREX instruction is directed through bus master port MP0, reads a value from memory address "A", loads it to a specified register, and tags the memory address "A" in an exclusive monitor. The second LDREX instruction is directed through MP1, reads a second value from memory address "B", loads it to a specified register, and tags the memory address "B" in another exclusive monitor. The SO/DV request is directed through MP1 for access to data at memory address "C" and operates separately from the first and second LDREX instructions. The STREX instruction is directed through MP1, stores a data value to memory address "B" only if the exclusive monitor tagged with memory address "B" is still in an exclusive state, and returns an indication if the store operation was successful.

The counters countPx 262 and countPs 264 are initialized to an initial count value. When the first LDREX instruction is directed through bus master port MP0, the counter countPx 262 is incremented and tagged with a bit indicating the port selected as MP0. When the second LDREX instruction is received from buffer 230, it is stalled instead of being directed through bus master port MP1 since the first LDREX instruction is still pending with countPx 262 not at its initial count value. The control circuit 266 looks ahead in the buffer 230 and identifies the SO/DV request and also verifies that the countPs 264 is at its initial value. Since the SO/DV request may operate separately from the load and store exclusive instructions, the control circuit 266 causes the SO/DV request to be directed through bus master port MP1, increments the counter countPs 264 and tagged with a bit indicating the port selected as MP1. The 4$^{th}$ request, the STREX instruction is also stalled since the first LDREX instruction is still pending. Once an acknowledgement is received that the first LDREX instruction is guaranteed to complete, the counter countPx 262 is decremented to its initial value. The second LDREX instruction is released and directed through bus master port MP1, causing countPx 262 to be incremented and tagged to indicate the port selected is MP1. The STREX instruction is also released and directed through bus master port MP1, since all requests going through the same port are guaranteed to complete in the order issued.

It is noted that the same stream of memory requests listed in Table 1 could be received in the processing system 200 of FIG. 2A. With the single counter countP 226, the SO/DV request would be stalled pending receiving the acknowledgement for the first LDREX instruction. It is also noted that a processor having access to multiple bus master ports, such as illustrated in the processing system 200, may in an alternative embodiment split a memory request stream based on availability of the multiple bus ports for transfers. For example in FIG. 2A, if the processor 206 determines that one of the two bus ports 216 and 217 is backed up with pending requests to be transferred, the processor 206 may selectively begin using the other bus port for the backed up transfers assuming the other bus port is available for these transfers.

Figure 3:
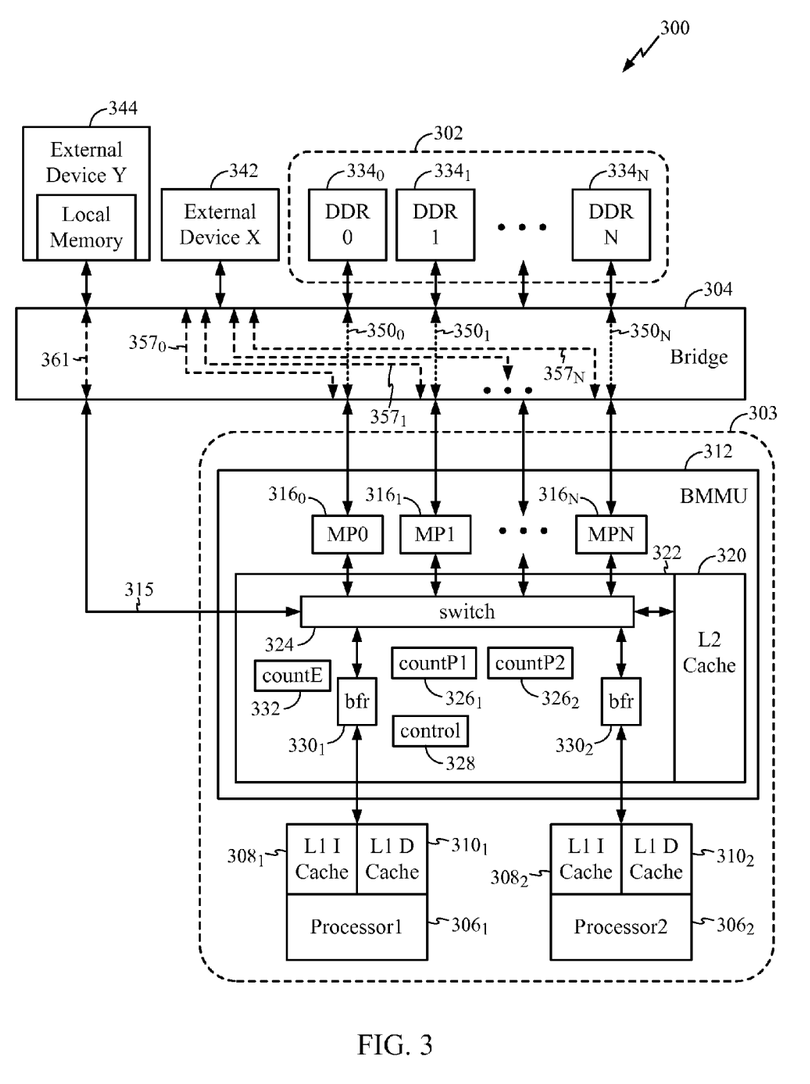
FIG. 3 illustrates an exemplary extended processing system configured to operate in a weakly ordered storage system in which an embodiment of the invention may be advantageously employed.

FIG. 3 illustrates an exemplary extended processing system 300 configured to operate in a weakly ordered storage system in which an embodiment of the invention may be advantageously employed. The extended processing system 300 is an extension of the processing system 200 shown in FIG. 2A. The main memory 302 of the extended processing system 300 is expanded to N memory elements, memory devices DDR0 $334_0$, DDR1 $334_1$, . . . , DDRN $334_N$, as compared to the main memory 202 of the processing system 200 of FIG. 2A. A second processor, processor2 $306_2$, is added to the system core 303 including its associated L1 I cache $308_2$ and L1 D cache $310_2$. Associated with the second processor are a buffer (bfr) $330_2$ and a second counter countP2 $326_2$.

Due to the addition of the one or more memory elements in main memory 302, the bridge 304 is expanded with additional memory channels indicated by paths $350_0$, $350_1$, . . . , $350_N$. The system core 303 is also expanded to N master ports MP0 $316_0$, MP1 $316_1$, . . . , MPN $316_N$. The switch 324 now supports the N master ports $316_0$-$316_N$. With these additions, the odd/even memory region addressing scheme is changed to a technique based on memory ranges. For example, with 1 KB memory regions, address bits 11 and 10 of a memory request address field are now used to direct memory requests to the appropriate memory element. In one embodiment with N equal to four, memory requests with address bits 11 and 10 equal to "00" are directed through the switch 324 to DDR0 $334_0$. Memory requests with address bits 11 and 10 equal to "01" are directed through the switch 324 to DDR1 $334_1$. Memory requests with address bits 11 and 10 equal to "10" are directed through the switch 324 to DDR2 $334_2$. Memory requests with address bits 11 and 10 equal to "11" are directed through the switch 324 to DDR3 $334_3$. It is noted that the main memory 202 of FIG. 2A may be expanded with an odd number of additional memory devices, such as a system having three memory devices, DDR0, DDR1, and DDR2. The techniques of the invention are applicable in such a system utilizing an appropriate address mapping approach.

A tracking approach for the extended processing system 300, is similar to the tracking approach for the processing system 200. A counter, countP2 $326_2$, is used that is similar to the counter countP $326_1$. The counter countP2 $326_2$ increments upon receipt of each memory request from processor2 $306_2$ and decrements when a response to a request is received that indicates the request will complete in order. Each additional processor would also add a counter and a buffer similar to the counter countP2 $326_2$ and buffer (bfr) $330_2$. New memory requests that change between a first DDR memory device, such as the DDR0 memory device $334_0$, to a different device such as one of the remaining memory devices, the DDR1 memory device $334_1$, or the DDR2 memory $334_2$, or . . . , the DDRN memory $334_N$, with pending memory requests associated with the previous memory device, are stalled until the pending memory requests are guaranteed to complete. A stalled memory request remains pending until enabled to be processed. Memory requests that target a different memory region than the current memory region being accessed are stalled and do not increment the counter. After pending requests are completed and the counter appropriately decremented to an initial count value, such as zero, a stalled request is enabled for processing and the counter is then incremented for the previously stalled request now being processed. Since memory requests within each memory region are guaranteed to complete in order, only memory requests that change between the different memory regions are monitored for the purpose of stalling requests to a different stream. SO/DV requests are monitored even if an SO/DV request is within the same stream of requests in order to increment the counter, such as the counter countP1 $326_1$.

The BMMU 312 splits a stream of memory requests and then request streams selected from paths $357_0$, $357_1$, . . . , $357_N$, are reconverged to an external slave device such as a DDR-X memory in external device X 342. When requests are presented on one of the paths $357_0$, $357_1$, . . . , $357_N$, by stalling requests to the other one of the paths $357_0$, $357_1$, . . . , $357_N$, the order of SO/DV memory requests that entered the switch 324 is the same that reaches the DDR-X memory in the external device X 342. It is noted that request streams from processor $306_1$ are monitored separately from request streams from processor $306_2$ and vice versa.

In some implementations, a control block such as the control block 228 of FIG. 2A would be duplicated as two control blocks in the extended processing system 300 of FIG. 3, each duplicated control block associated with one of the two processors $306_1$ and $306_2$. In an alternative embodiment based on the second processing system 260 of FIG. 2B, the countP1 $326_1$ would be extended to a countPx1 and a countPs1 and the countP2 $326_2$ would be extended to a countPx2 and a countPs2. The control circuit 328 is appropriately expanded to support the ordering control of LDREX and STREX instructions and SO/DV requests, as described above with regard to FIG. 2B. Each processor's requests are controlled as described above with respect to FIG. 2B. In these approaches, for N CPUs there are N copies of the hardware required to implement the techniques as described above.

Figure 4:
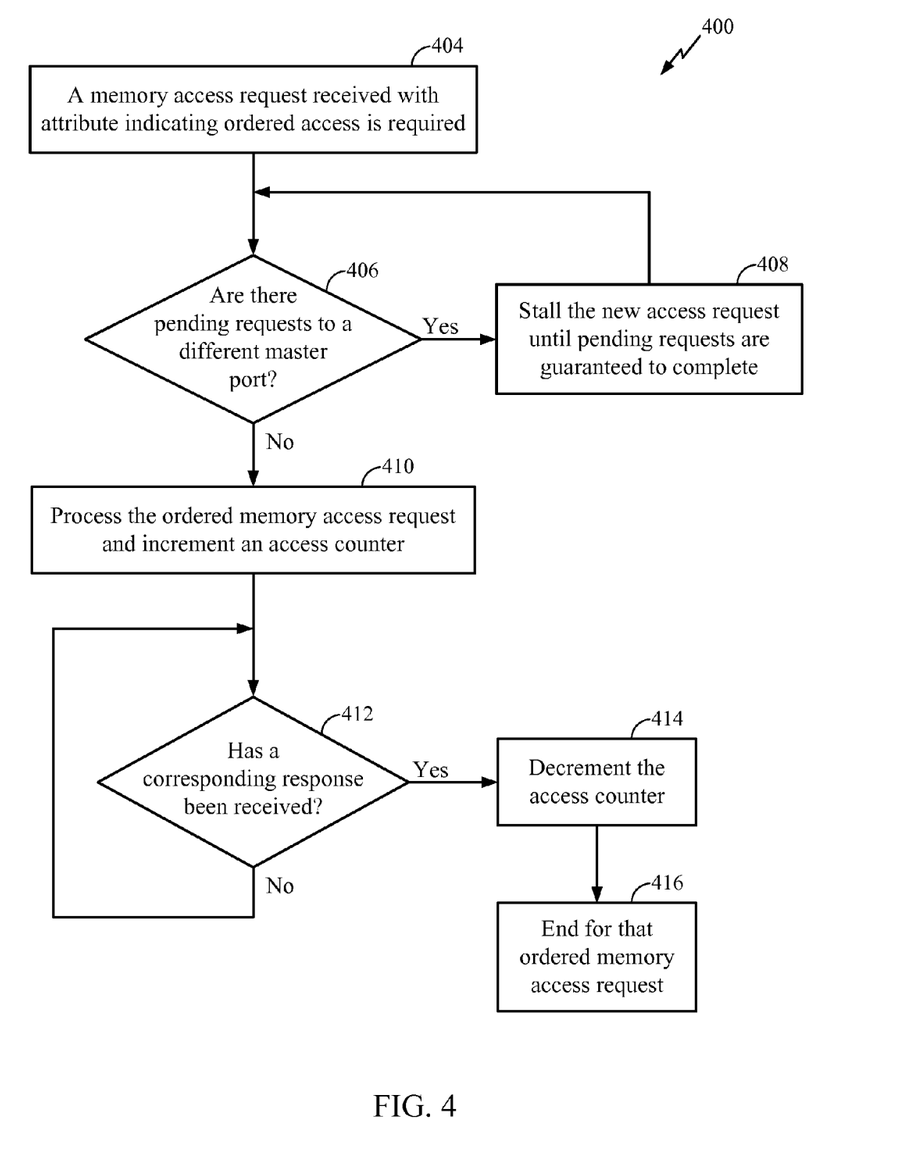
FIG. 4 illustrates an exemplary process for controlling ordered accesses in a weakly ordered storage system in which an embodiment of the invention may be advantageously employed.

FIG. 4 illustrates an exemplary process 400 for controlling ordered accesses in a weakly ordered storage system in which an embodiment of the invention may be advantageously employed. At block 404, a memory access request from the processor 206 of FIG. 2A or 2B or the processor $306_1$ of FIG. 3 with an attribute asserted indicating ordered access is required is received at a bus and memory management unit (BMMU), such as BMMU 212 or BMMU312, respectively. At decision block 406, a determination is made in control circuit 228, 266, or 328 whether there is one or more pending requests to a different memory element and associated master port than the received ordered memory access request. If there is a pending ordered memory access request to a different memory element, the process 400 proceeds to block 408. At block 408, the new access ordered memory access request is stalled until the pending ordered memory access request or requests are guaranteed to complete. The process 400 then returns to block 406. If there are no pending requests to a different memory element and associated master port, the process 400 proceeds to block 410. At block 410, the new ordered memory access request is processed and an access counter is incremented. At block 412, a determination is made whether corresponding response has been received for the new ordered memory access. If no response has been received for the new ordered memory access request now pending, the process remains at the block 412 waiting for resolution of the pending ordered memory access request. If a response for the pending ordered memory access request has been received, the process 400 proceeds to block 414. At block 414, the process 400 decrements the access counter. At block 416, the process 400 ends for that ordered memory access request.

The various illustrative logical blocks, modules, circuits, elements, or components described in connection with the embodiments disclosed herein may be implemented using an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, a special purpose controller, or a micro-coded controller. A system core may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied in hardware and software executed by a processor. The processor 206 may access instructions and data from the main memory 202 in the execution of a program, for example. The software comprising one or more processor programs is stored as non-transitory signals on a computer readable storage medium. The computer readable storage medium may be directly associated with a processor, such as processor 206, processor $306_1$, processor $306_2$, or a processor in one of the peripheral devices, such as the external device Y 244, or accessible, for example through the bus and memory management unit (BMMU) 212 or other interfacing means. The storage medium may be coupled to the processor such that the processor can read information from, and in some cases write information to, the storage medium. The storage medium coupling to the processor may be a direct coupling integral to a circuit implementation or may utilize one or more interfaces, supporting direct accesses or data streaming using down loading techniques. The computer readable storage medium may include random access memory (RAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), compact disk (CD), digital video disk (DVD), other types of removable disks, or any other suitable storage medium.

While the invention is disclosed in the context of illustrative embodiments for use in processor systems it will be recognized that a wide variety of implementations may be employed by persons of ordinary skill in the art consistent with the above discussion and the claims which follow below. For example, fixed function implementations may also utilize various embodiments of the present invention.

What is claimed is:

1. A method for ordering memory requests requiring ordered memory accesses, the method comprising:
    splitting a stream of memory requests from a single source according to an address attribute into two or more streams of memory requests;
    identifying a memory request that requires ordered memory accesses in one of the two or more streams of memory requests, the memory request having a first address attribute; and
    stalling the memory request that requires ordered memory accesses upon determining a previous memory request from a different one of the two or more streams of memory requests is pending and has a second address attribute.

2. The method of claim 1, wherein the address attribute is an address boundary value.

3. The method of claim 2, wherein the address boundary value is an address bit which determines whether a memory region is an odd address memory region or an even address memory region.

4. The method of claim 2, wherein the address boundary value is determined from a plurality of bits in a memory request address that identifies one of N memory regions.

5. The method of claim 1, wherein the stream of memory requests is split according to an availability to transfer data on each stream of memory requests of the two or more streams of memory requests.

6. The method of claim 1, wherein a memory request in the stream of memory requests is directed to one of N memory regions according to the address boundary value.

7. The method of claim 1, wherein the memory request requiring ordered memory accesses is a strongly ordered memory request or a device memory request (SO/DV).

8. The method of claim 1, wherein the memory request requiring ordered memory accesses is a sequence of memory access exclusive instructions that provide atomic memory accesses.

9. The method of claim 1, wherein the stalled memory request is processed after receiving an indication that the pending previous memory request is guaranteed to complete in order.

10. The method of claim 1 further comprising:
incrementing a memory access counter for each memory request; and
decrementing the memory access counter for each memory request indicated to be guaranteed to complete in the desired order, wherein a count value in the memory access counter different from an initialized state of the memory access counter indicates one or more pending requests have not been guaranteed to complete in the desired order.

11. An apparatus for ordering memory requests requiring ordered memory accesses, the apparatus comprising:
a stream splitting circuit configured to monitor a first stream of memory requests from a single source and configured to split the first stream of memory requests based on address attribute of each memory request into a second stream of memory requests and a third stream of memory requests;
a tracking circuit configured to detect a memory request at a first interleaved memory address requiring ordered memory accesses from the second stream of memory requests that is a different stream of memory requests from the third stream of memory requests having a pending memory request at a second interleaved memory address; and
a stall circuit configured to stall the second stream of memory requests requiring ordered memory accesses in response to the pending memory request until the pending memory request is guaranteed to complete in order.

12. The apparatus of claim 11, wherein the split is determined according to the address attribute based on a number of memory regions and a memory region size.

13. The apparatus of claim 11, wherein the first stream of memory requests is split according to an availability to transfer data on each stream of memory requests of the two or more streams of memory requests.

14. The apparatus of claim 11, wherein the tracking circuit comprises:
a counter that is configured to increment upon receiving a memory request from the second stream of memory requests or from the third stream of memory requests that is the same stream of memory requests as a previous memory request and to indicate the received memory request is pending, wherein the counter is configured to decrement upon receiving an acknowledgement that the pending memory request is guaranteed to complete in order.

15. The apparatus of claim 11 further comprising:
a first memory region and a second memory region, wherein the second stream of memory requests is associated with the first memory region and the third stream of memory requests associated with the second memory region; and
a processor configured to generate the first stream of memory requests, wherein each memory request includes an associated address attribute that identifies the first memory region as an odd address memory region and the second memory region as an even address memory region.

16. The apparatus of claim 11, wherein the address attribute is one or more address bits that identifies two or more streams of memory requests.

17. The apparatus of claim 11, further comprising:
N memory regions, wherein the first stream of memory requests is monitored and split into N streams of memory requests, wherein each stream of memory requests is associated with a different memory region of the N memory regions; and
a processor configured to generate the first stream of memory requests, wherein each memory request includes an associated address attribute that identifies one of the N memory regions.

18. The apparatus of claim 11, wherein the tracking circuit comprises:
a second counter that is configured to increment upon receiving a strongly ordered or device (SO/DV) memory request from a second stream of SO/DV memory requests or from a third stream of device memory requests that is the same stream of device memory requests as a previous device memory request and to indicate the received SO/DV memory request is pending, wherein the second counter is configured to decrement upon receiving an acknowledgement that the pending device memory request is guaranteed to complete in order.

19. The apparatus of claim 11, wherein the memory request requiring ordered memory accesses is a memory access exclusive instruction that provides atomic memory access.

20. The apparatus of claim 11, wherein the pending memory request is in response to a memory access exclusive instruction, wherein processing of the stalled second stream of memory requests is enabled after receiving indication that the pending memory request is guaranteed to complete in order.

21. An apparatus for ordering memory accesses, the apparatus comprising:
a switch and control circuit configured to interleave a stream of memory requests into two or more streams of memory requests directed to two or more corresponding bus ports according to an attribute associated with the corresponding bus ports;
a tracking circuit configured to detect a memory request at a first interleaved memory address requiring ordered memory access in a first stream of memory requests and to detect at least one pending memory request at a second interleaved memory address in a second stream of memory requests; and
a stall circuit configured to stall the ordered memory access request until the tracking circuit indicates there are no more pending memory requests.

22. The apparatus of claim 21, wherein the attribute is based on a number of memory regions and a memory region size.

23. The apparatus of claim 21, wherein the stream of memory requests is from a single source and is interleaved into the two or more streams of memory requests based on an availability to transfer data on each stream of memory requests of the two or more streams of memory requests.

24. The apparatus of claim 21, wherein the attribute is based on a memory interleave address.

25. The apparatus of claim 21, wherein the attribute is based on a hash of a destination address of a memory request.

26. The apparatus of claim 21, wherein the switch and control circuit monitors a bit field within a destination address field of the memory request to determine the attribute.

27. The apparatus of claim 21, wherein the ordered memory access request has an asserted strongly ordered attribute.

28. The apparatus of claim 21, wherein the tracking circuit comprises:
 a memory access counter configured to increment for each received memory request and to decrement for each received memory request that is guaranteed to complete, wherein a count value in the memory access counter different from an initialized state of the memory access counter indicates there is one or more pending memory requests that have not been guaranteed to complete.

29. The apparatus of claim 21 further comprising:
 a tracking circuit configured to detect a memory request with an asserted device attribute in a first stream of memory requests and to detect one or more pending memory requests in a second stream of memory requests; and
 a stall circuit configured to stall the device memory request until the tracking circuit indicates there are no more pending memory requests.

30. The apparatus of claim 21, wherein the attribute is an address bit which determines whether a memory region is an odd address memory region or an even address memory region.

31. The apparatus of claim 21, wherein the stalled ordered memory access request is processed after receiving acknowledgements that the pending memory requests are guaranteed to complete in order.

32. A computer readable non-transitory medium encoded with computer readable program data and code, the program data and code when executed operable to:
 split a stream of memory requests from a single source according to an address attribute into two or more streams of memory requests;
 identify a memory request requiring ordered memory accesses in one of the two or more streams of memory requests, the memory request having a first attribute; and
 stall the memory request requiring ordered memory accesses upon determining a previous memory request from a different one of the two or more streams of memory requests is pending, and has a second address attribute.

33. An apparatus for ordering memory requests requiring ordered memory accesses, the apparatus comprising:
 means for monitoring a first stream of memory requests from a single source and for splitting the first stream of memory requests based on an address attribute of each memory request into a second stream of memory requests and a third stream of memory requests;
 means for detecting a memory request at a first interleaved memory address requiring ordered memory accesses from the second stream of memory requests that is a different stream of memory requests from the third stream of memory requests having a pending memory request at a second interleaved memory address; and
 means for stalling the second stream of memory requests requiring ordered memory accesses in response to the pending memory request until the pending memory request is guaranteed to complete in order.

34. An apparatus for ordering memory accesses, the apparatus comprising:
 means for interleaving a stream of memory requests into two or more streams of memory requests directed to two or more corresponding bus ports according to an attribute associated with the corresponding bus ports;
 means for detecting a memory request at a first interleaved memory address requiring ordered memory access in a first stream of memory requests and for detecting at least one pending memory request at a second interleaved memory address in a second stream of memory requests; and
 means for stalling the ordered memory access request until there is an indication that there are no more pending memory requests.

* * * * *